(12) United States Patent
Buchet

(10) Patent No.: US 12,497,153 B2
(45) Date of Patent: Dec. 16, 2025

(54) INTERLOCK ASSEMBLY FOR AN AIRCRAFT DOOR

(71) Applicant: Rohr, Inc., Chula Vista, CA (US)

(72) Inventor: Damien Buchet, Toulouse (FR)

(73) Assignee: Rohr, Inc., Chula Vista, CA (US)

(*) Notice: Subject to any disclaimer, the term of this patent is extended or adjusted under 35 U.S.C. 154(b) by 152 days.

(21) Appl. No.: 18/416,970

(22) Filed: Jan. 19, 2024

(65) Prior Publication Data
US 2024/0247529 A1  Jul. 25, 2024

Related U.S. Application Data

(60) Provisional application No. 63/440,018, filed on Jan. 19, 2023.

(51) Int. Cl.
| | |
|---|---|
| *B64C 1/14* | (2006.01) |
| *B64D 25/14* | (2006.01) |
| *B64D 25/00* | (2006.01) |

(52) U.S. Cl.
CPC .............. *B64C 1/1407* (2013.01); *B64C 1/14* (2013.01); *B64C 1/1423* (2013.01); *B64D 25/14* (2013.01); *B64D 25/00* (2013.01); *E05Y 2900/502* (2013.01)

(58) Field of Classification Search
CPC ....... B64C 1/1407; B64C 1/14; B64C 1/1423; B64D 25/14; B64D 25/00
See application file for complete search history.

(56) References Cited

U.S. PATENT DOCUMENTS

| | | | |
|---|---|---|---|
| 4,106,729 A | 8/1978 | Bergman | |
| 5,156,359 A | 10/1992 | Noble | |
| 5,337,977 A * | 8/1994 | Fleming | B64C 1/143 |
| | | | D12/345 |
| 9,751,635 B2 * | 9/2017 | Heuer | B64D 45/00 |
| 10,647,403 B2 * | 5/2020 | Merkel | B64G 1/60 |
| 2007/0170730 A1 | 7/2007 | Hall | |
| 2016/0107755 A1 | 4/2016 | Bessettes | |
| 2020/0346768 A1 * | 11/2020 | Romec | B64D 25/14 |
| 2022/0135201 A1 * | 5/2022 | Mortland | B64C 1/1423 |
| | | | 244/129.5 |
| 2024/0025530 A1 * | 1/2024 | Devillez | B64C 1/1423 |

OTHER PUBLICATIONS

EP Search Report for EP Patent Application No. 24152943.7 dated Jun. 20, 2024.

* cited by examiner

*Primary Examiner* — Justin B Rephann
(74) *Attorney, Agent, or Firm* — Getz Balich LLC

(57) ABSTRACT

An interlock assembly for an aircraft door includes a shaft, an interlock first portion, and an auto-disarm second portion. The shaft is rotatable about the second rotational axis between an armed position and a disarmed position. The shaft includes an interlock cam and an auto-disarming cam. In a first interlock position, the interlock first portion permits rotation of the shaft between the armed position and the disarmed position. In a second interlock position, the interlock first portion prevents rotation of the shaft from the disarmed position to the armed position. In a first auto-disarm position, the auto-disarm second portion permits rotation of the shaft between the armed position and the disarmed position. In a second auto-disarm position, the auto-disarm second portion prevents rotation of the shaft from the disarmed position to the armed position.

20 Claims, 6 Drawing Sheets

INTERLOCK ASSEMBLY FOR AN AIRCRAFT DOOR

This application claims priority to U.S. Patent Appln. No. 63/440,018 filed Jan. 19, 2023, which is hereby incorporated herein by reference in its entirety.

BACKGROUND

1. Technical Field

This disclosure relates generally to an aircraft door assembly and, more particularly, to an interlock assembly for an aircraft door emergency support system (ESS).

2. Background Information

Aircraft doors, such as passenger doors for an aircraft cabin, may include one or more support systems configured to be activated to facilitate evacuation of the aircraft in an emergency. However, during some conditions, it may be desirable for those emergency support systems to be inactive. Various systems and methods for controlling an active or inactive condition of aircraft door emergency support systems are known in the art. While these known systems and methods have various advantages, there is still room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a door assembly for an aircraft includes a door, an interior door handle and an exterior door handle, and an emergency support system (ESS). The interior door handle and the exterior door handle are rotatable about a first rotational axis. The ESS includes a mode selector and an interlock assembly. The interlock assembly includes a shaft, an interlock first portion of the interior door handle, and an auto-disarm second portion of the exterior door handle. The mode selector has a selected mode. The selected mode is one of an armed mode or a disarmed mode. The shaft extends along a second rotational axis between and to a first shaft end and a second shaft end. The first shaft end is operably connected to the mode selector. The shaft is rotatable about the second rotational axis between an armed position and a disarmed position. The shaft includes an interlock cam and an auto-disarming cam at the second shaft end. The interlock first portion is rotatable about the first rotational axis between a first interlock position and a second interlock position. In the first interlock position, the interlock first portion permits rotation of the shaft between the armed position and the disarmed position. In the second interlock position, the interlock first portion prevents rotation of the shaft from the disarmed position to the armed position. The auto-disarm second portion is disposed at the interlock first portion on the first rotational axis. The auto-disarm second portion is rotatable about the first rotational axis between a first auto-disarm position and a second auto-disarm position. In the first auto-disarm position, the auto-disarm second portion permits rotation of the shaft between the armed position and the disarmed position. In the second auto-disarm position, the auto-disarm second portion prevents rotation of the shaft from the disarmed position to the armed position.

In any of the aspects or embodiments described above and herein, the interlock cam may extend in a first direction from the second rotational axis to a first distal end of the interlock cam, the auto-disarm cam may extend in a second direction from the second rotational axis to a second distal end of the auto-disarm cam, the first direction may be offset from the second direction by an offset angle relative to the second rotational axis, and the offset angle may be greater than 90 degrees.

In any of the aspects or embodiments described above and herein, the locking cam may be disposed at the interlock first portion.

In any of the aspects or embodiments described above and herein, the auto-disarm cam may be disposed radially between the locking cam and the first shaft end relative to the second rotational axis.

In any of the aspects or embodiments described above and herein, the interlock first portion may form a locking sector extending circumferentially about the first rotational axis between and to a first circumferential end and a second circumferential end. The locking sector may form a circumferential gap between the first circumferential end and the second circumferential end. In the first interlock position, the interlock cam may be disposed circumferentially coincident with the circumferential gap. In the second interlock position, the interlock cam may be disposed circumferentially coincident with the locking sector.

In any of the aspects or embodiments described above and herein, in the second interlock position, the locking sector may be configured to prevent rotation of the shaft from the disarmed position to the armed position by blocking rotation of the interlock cam about the second rotational axis.

In any of the aspects or embodiments described above and herein, the auto-disarm second portion may include a disarming bumper. The disarming bumper may be radially coincident with the auto-disarm cam.

In any of the aspects or embodiments described above and herein, the disarming bumper may be configured to contact the auto-disarm cam to effect rotation of the shaft from the armed position to the disarmed position as the auto-disarm second portion rotates from the first auto-disarm position to the second auto-disarm position.

In any of the aspects or embodiments described above and herein, the auto-disarm second portion may include a cylindrical body extending circumferentially about the first rotational axis. The disarming bumper may be disposed at a circumferential position of the cylindrical body relative to the first rotational axis. The disarming bumper may extend radially outward from the cylindrical body relative to the first rotational axis.

In any of the aspects or embodiments described above and herein, in the armed position of the shaft, the auto-disarm cam may be disposed axially coincident with the disarming bumper, relative to the first rotational axis. In the disarmed position of the shaft, the auto-disarm cam may be axially separated from the disarming bumper, relative to the first rotational axis.

In any of the aspects or embodiments described above and herein, each of the interior door handle and the exterior door handle may be independently rotatable about the first rotational axis relative to an other of the interior door handle and the exterior door handle.

According to another aspect of the present disclosure, a door assembly for an aircraft includes a door, an interior door handle and an exterior door handle, a mode selector, and an interlock assembly for the mode selector. The interior door handle and an exterior door handle are rotatable about a first rotational axis. The mode selector has a selected mode. The selected mode is one of an armed mode or a disarmed mode. The interlock assembly includes a shaft, an interlock first portion of the interior door handle, and an auto-disarm second portion of the exterior door handle. The shaft extends along a second rotational axis between and to a first shaft end and a second shaft end. The first shaft end is operably connected to the mode selector. The shaft is rotatable about the second rotational axis between an armed position and a disarmed position corresponding to the armed mode and the disarmed mode, respectively. The shaft includes an interlock cam and an auto-disarming cam. The interlock first portion is rotatable with the interior door handle about the first rotational axis between a first interlock position and a second interlock position. In the first interlock position, the interlock first portion permits rotation of the shaft between the armed position and the disarmed position. In the second interlock position, the interlock first portion obstructs rotation of the shaft from the disarmed position to the armed position. The auto-disarm second portion is rotatable with the exterior door handle about the first rotational axis between a first auto-disarm position and a second auto-disarm position. In the first auto-disarm position, the auto-disarm second portion permits rotation of the shaft between the armed position and the disarmed position. In the second auto-disarm position, the auto-disarm second portion obstructs rotation of the shaft from the disarmed position to the armed position.

In any of the aspects or embodiments described above and herein, the second rotational axis may be perpendicular to the first rotational axis.

In any of the aspects or embodiments described above and herein, the door assembly may further include an emergency support system (ESS). The ESS may include the mode selector, the interlock assembly, and an actuation system operably connected to the door. The mode selector may be selectively configurable in the armed mode or the disarmed mode to control actuation of the actuation system.

In any of the aspects or embodiments described above and herein, the door assembly may further include an emergency support system (ESS). The ESS may include an inflatable slide operably connected to the door. The mode selector may be selectively configurable in the armed mode or the disarmed mode to control actuation of the inflatable slide.

In any of the aspects or embodiments described above and herein, the auto-disarm second portion may includes a disarming bumper. The disarming bumper may be radially coincident with the auto-disarm cam.

In any of the aspects or embodiments described above and herein, the auto-disarm cam may include a concave side configured to face the disarming bumper with the shaft in the armed position.

According to another aspect of the present disclosure, an interlock assembly for an aircraft door includes a shaft, an interlock first portion, and an auto-disarm second portion. The shaft extends along a second rotational axis between and to a first shaft end and a second shaft end. The shaft is rotatable about the second rotational axis between an armed position and a disarmed position. The shaft includes an interlock cam and an auto-disarming cam at the second shaft end. The interlock first portion is rotatable about a first rotational axis between a first interlock position and a second interlock position. The interlock first portion includes a first cylindrical body and a locking sector. The first cylindrical body extends circumferentially about the first rotational axis. The locking sector extends circumferentially about the first rotational axis between and to a first circumferential end and a second circumferential end. The locking sector extends radially outward from the first cylindrical body relative to the first rotational axis. The locking sector forms a circumferential gap between the first circumferential end and the second circumferential end. In the first interlock position, the locking sector is positioned to permit rotation of the shaft between the armed position and the disarmed position. In the second interlock position, the locking sector is positioned to obstruct the interlock cam to prevent rotation of the shaft from the disarmed position to the armed position. The auto-disarm second portion is disposed axially adjacent the interlock first portion relative to the first rotational axis. The auto-disarm second portion is rotatable about the first rotational axis between a first auto-disarm position and a second auto-disarm position. The auto-disarm second portion includes a second cylindrical body and a disarming bumper. The second cylindrical body extends circumferentially about the first rotational axis. The disarming bumper extends radially outward from the second cylindrical body relative to the first rotational axis. The disarming bumper is radially coincident with the auto-disarm cam relative to the first rotational axis. In the first auto-disarm position, the disarming bumper is positioned to permit rotation of the shaft between the armed position and the disarmed position. In the second auto-disarm position, the disarming bumper is positioned to obstruct the auto-disarm cam to prevent rotation of the shaft from the disarmed position to the armed position.

In any of the aspects or embodiments described above and herein, the second rotational axis may be perpendicular to the first rotational axis.

In any of the aspects or embodiments described above and herein, the disarming bumper may be configured to contact the auto-disarm cam to effect rotation of the shaft from the armed position to the disarmed position as the auto-disarm second portion rotates from the first auto-disarm position to the second auto-disarm position.

The present disclosure, and all its aspects, embodiments and advantages associated therewith will become more readily apparent in view of the detailed description provided below, including the accompanying drawings.

DETAILED DESCRIPTION

Figure 1:
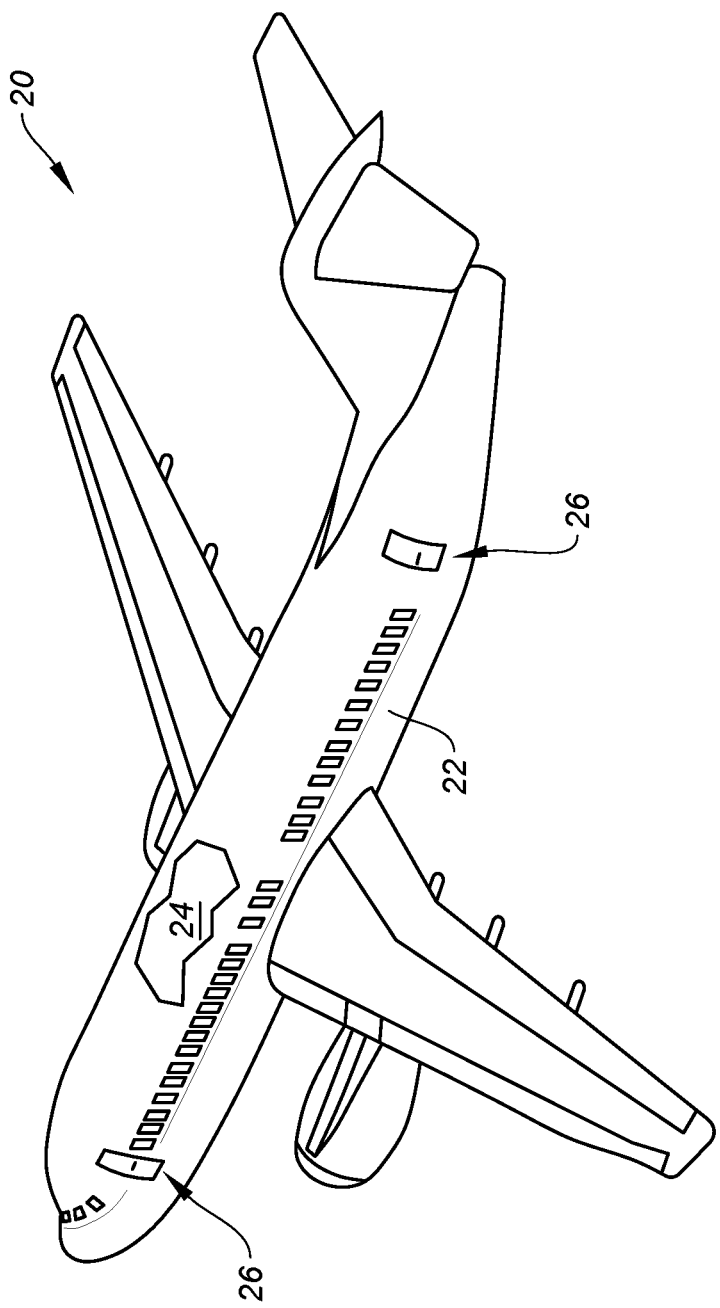
FIG. 1 illustrates a perspective view of an aircraft, in accordance with one or more embodiments of the present disclosure.

FIG. 1 illustrates an aircraft 20 such as an airplane. This aircraft 20 includes a fuselage 22. The fuselage 22 forms and surrounds a cabin 24 (e.g., a passenger cabin, a pressurized compartment, etc.) and other interior compartments (e.g., a cargo bay) of the aircraft 20. The fuselage 22 includes at least one door assembly 26 (e.g., a passenger door assembly, a service door assembly, a cargo door assembly, an emergency exit door assembly, etc.).

Figure 2:
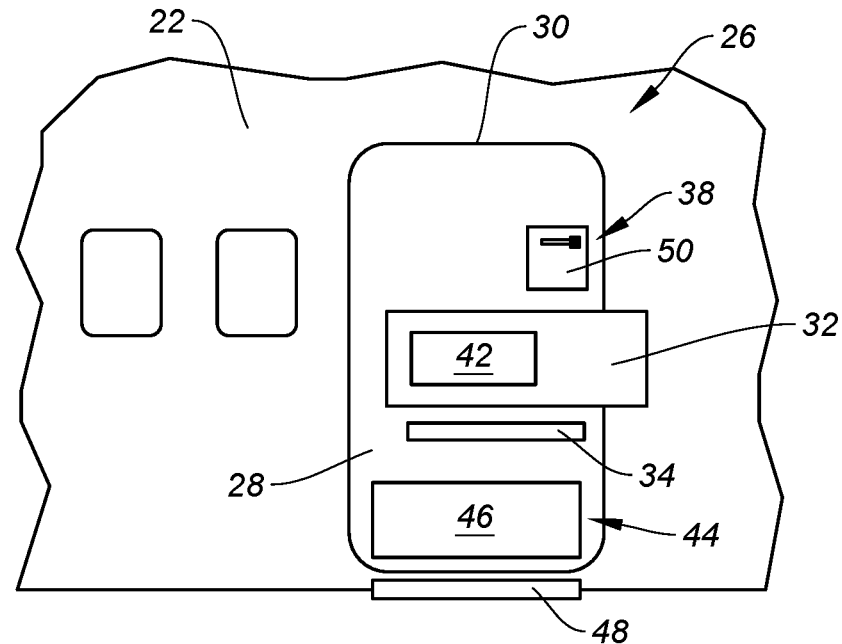
FIG. 2 schematically illustrates an interior of an aircraft door assembly and a surrounding portion of an aircraft fuselage, in accordance with one or more embodiments of the present disclosure.
Figure 3:
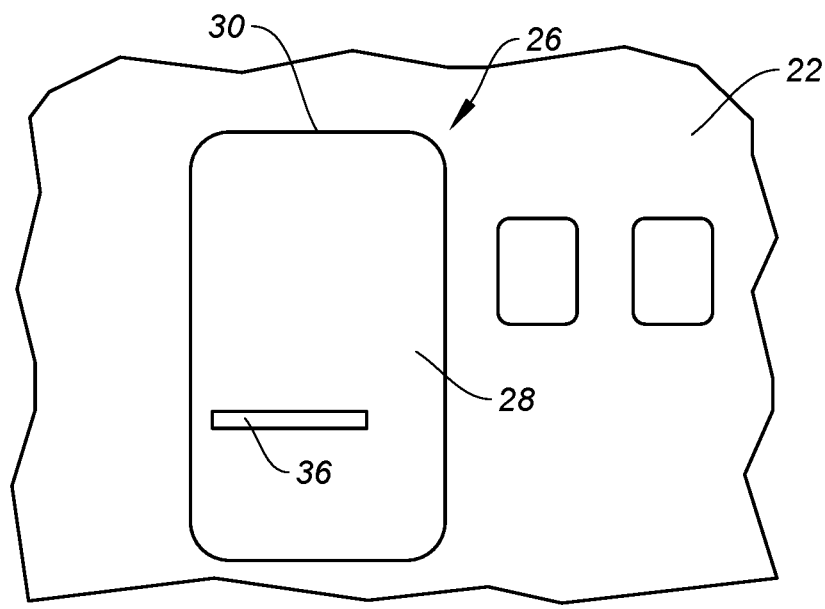
FIG. 3 schematically illustrates an exterior of the aircraft door assembly and a surrounding portion of an aircraft fuselage, in accordance with one or more embodiments of the present disclosure.

Referring to FIGS. 2 and 3, the door assembly 26 includes a door 28, a door frame 30, at least one door hinge 32, an interior door handle 34, an exterior door handle 36, and an emergency support system (ESS) 38. FIG. 2 schematically illustrates an interior view of the door assembly 26. FIG. 3 schematically illustrates an exterior view of the door assembly 26.

Figure 4A:
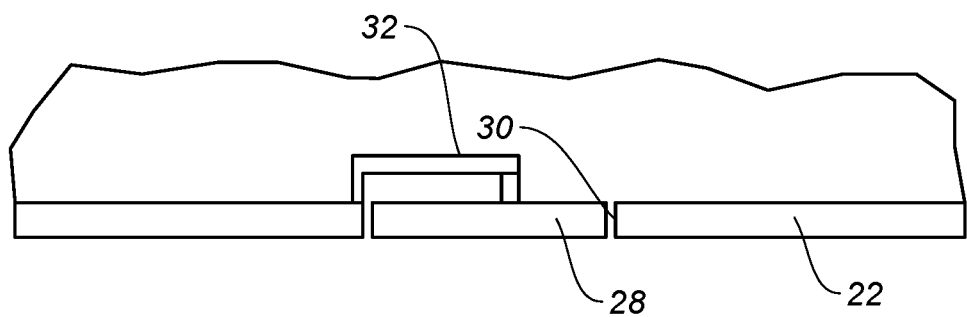
FIGS. 4A-B schematically illustrate the aircraft door assembly with a door in an open position and a closed position, in accordance with one or more embodiments of the present disclosure.
Figure 4B:
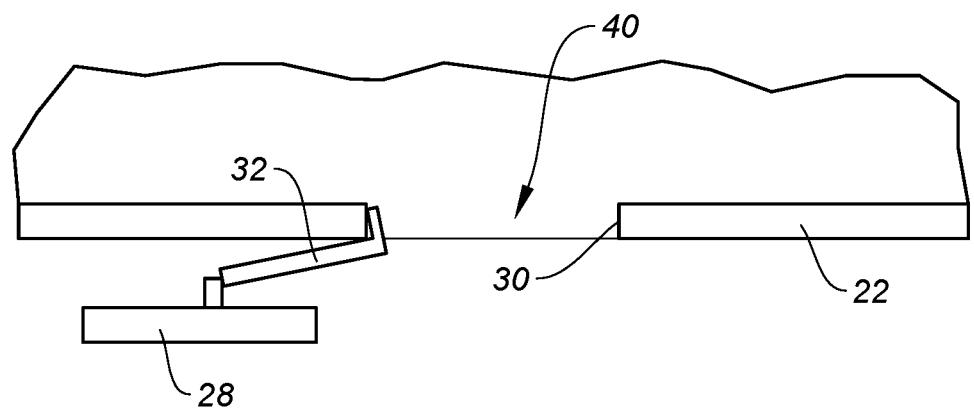

The door 28 is configured to move between a stowed, closed position (see FIG. 4A) and a deployed, open position (see FIG. 4B). For example, during opening of the door 28 of FIGS. 4A and 4B, the door 28 moves away from surrounding, fixed portions of the fuselage 22 and out of the door frame 30. The door 28 then translates laterally to a side of the door frame 30 to uncover a door opening 40. This door 28 movement is facilitated by the at least one door hinge 32. The at least one door hinge 32 movable mounts the door 28 to a fixed portion of the fuselage 22.

The door 28 may be opened (or closed) using the interior door handle 34 at an interior of the fuselage 22 and its door 28. The interior door handle 34 is rotatable between and to an unlatched position and a latched position. With the interior door handle 34 in the unlatched position, the door 28 is configured to move from the closed position to the open position. With the interior door handle 34 (and the exterior door handle 36) in the latched position, the door 28 is configured to be securely retained in the closed position (e.g., to seal the pressurized passenger cabin). The door 28 may additionally or alternatively be opened (or closed) using the exterior door handle 36 at an exterior of the fuselage 22 and its door 28. The exterior door handle 36 is rotatable between and to an unlatched position and a latched position. The exterior door handle 36 is rotatable independent of the interior door handle 34. With the exterior door handle 36 in the unlatched position, the door 28 is configured to move from the closed position to the open position. With the exterior door handle 36 (and the interior door handle 34) in the latched position, the door 28 is configured to be securely retained in the closed position (e.g., to seal the pressurized passenger cabin).

The ESS 38 is configured for use during an emergency, for example, to facilitate evacuation of the aircraft 20 using the door assembly 26. The ESS 38 may provide power for moving the door 28 from the closed position to the open position during at least some operating conditions for the door 28, as will be discussed in further detail. For example, the ESS 38 may include an actuation system 42 (sometimes referred to as an emergency puller assist system (EPAS); e.g., a pneumatic actuation system or an electro-mechanical actuation system) configured to assist a user opening the door 28 in an emergency. The actuation system 42 of FIG. 2 is disposed at (e.g., on, adjacent, or proximate) the at least one door hinge 32. The ESS 38 may include an inflatable slide assembly 44 for the door assembly 26. The inflatable slide assembly 44 may operate in combination with or separately from the actuation system 42. The inflatable slide assembly 44 of FIG. 2 includes an inflatable slide 46 and a girt bar 48. The inflatable slide 46 may be stored within a portion of the door 28 (e.g., a slide bustle) in an undeployed condition. The girt bar 48 of FIG. 2 may be attached to a floor of the aircraft 20 at (e.g., on, adjacent, or proximate) the door 28. The inflatable slide 46 is fixedly attached to the girt bar 48. During at least some operating conditions for the door 28, such as during an emergency opening of the door for which the ESS 38 (e.g., the actuation system 42) may provide power for moving the door 28 from the closed position to the open position, the opening of the door 28 may pull the inflatable slide 46 from the door 28 (e.g., from the slide bustle). The inflatable slide 46 may then be actuated (e.g., inflated) by a compressed gas cylinder or other system for supplying compressed gas to the inflatable slide 46.

Figure 5:
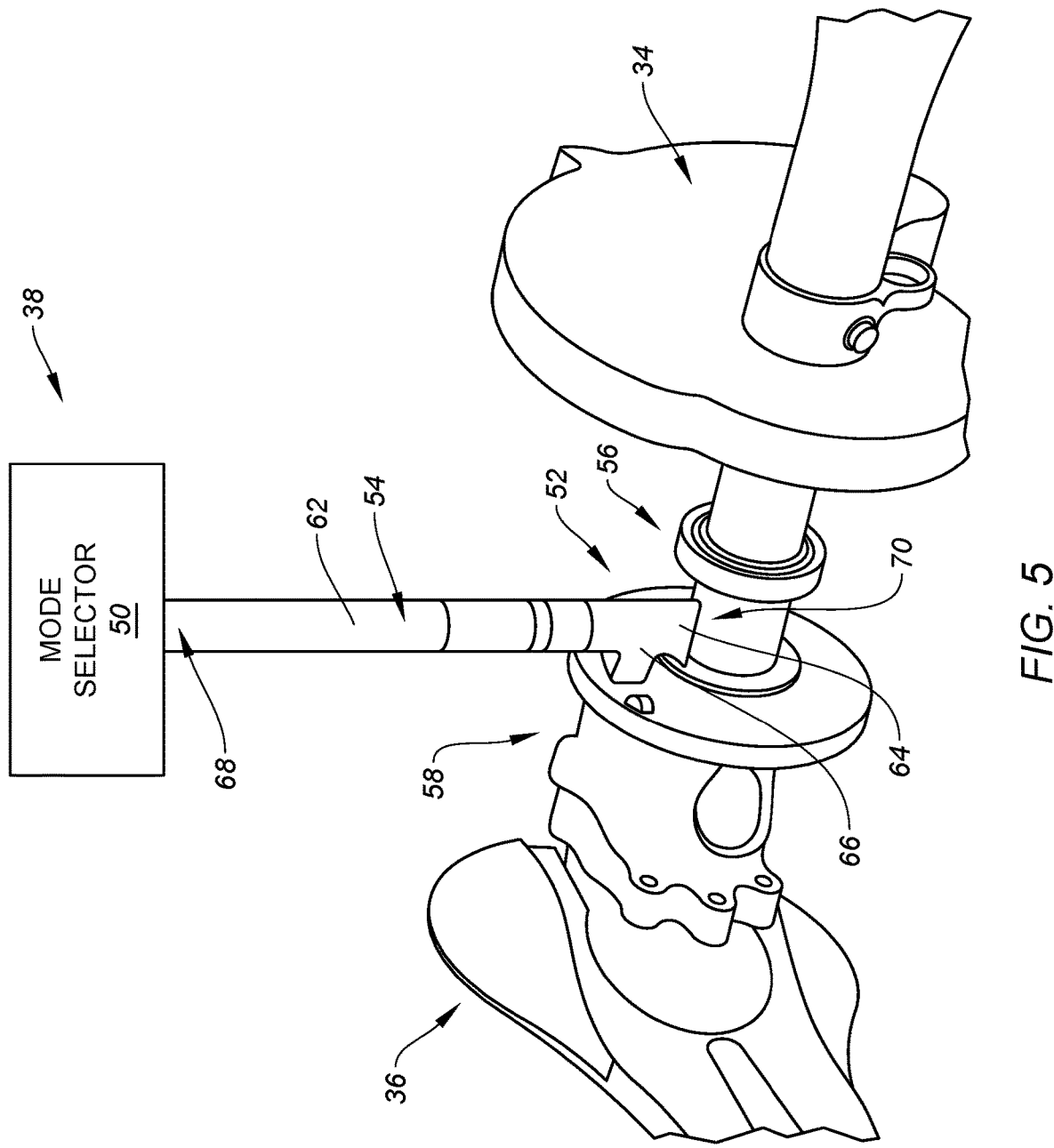
FIG. 5 illustrates a perspective view of a portion of the aircraft door assembly, in accordance with one or more embodiments of the present disclosure.

Referring to FIGS. 2 and 5, the ESS 38 further includes a mode selector 50 and an interlock assembly 52. The mode selector 50 may be disposed at (e.g., on, adjacent, or proximate) the door 28 as shown, for example, in FIG. 2. The mode selector 50 has a selected mode for the ESS 38. The selected mode of the mode selector 50 is one of an armed mode or a disarmed mode. The selected mode of the mode selector 50 may be manually selected at (e.g., on, adjacent, or proximate) the mode selector 50. For example, the mode selector 50 may include a switch, lever, pushbutton, or other control configuration for allowing a user to place the mode selector 50 in the armed mode or the disarmed mode. With the mode selector 50 in the armed mode, opening the door 28 (e.g., using the interior door handle 34) may cause the actuation system 42 to assist opening of the door 28 and/or the inflatable slide assembly 44 to deploy the inflatable slide 46. With the mode selector 50 in the disarmed mode, the door 28 may be opened (e.g., using the interior door handle 34) without initiating operation of the actuation system 42 to assist opening of the door 28 and/or the inflatable slide assembly 44 to deploy the inflatable slide 46. The mode selector 50 may be operably connected to the actuation system 42 and/or the inflatable slide assembly 44 by any electrical, electronic, or mechanical assembly conventionally known in the art to control actuation or non-actuation of the actuation system 42 and/or the inflatable slide assembly 44.

Referring to FIGS. 5 and 6A-D, the interlock assembly 52 is disposed within the door 28 (see FIGS. 1-4). The interlock assembly 52 includes a triggering shaft 54, a interlock first portion 56 of the interior door handle 34, and a auto-disarm second portion 58 of the exterior door handle 36. FIG. 5 illustrates a perspective view of the interlock assembly 52. FIGS. 6A-D illustrate cutaway views of the interlock assembly 52 for various positions of the triggering shaft 54, the interlock first portion 56, and the auto-disarm second portion 58.

The triggering shaft 54 is operably connected to the mode selector 50. The triggering shaft 54 is rotatable about a rotational axis 60 between and to an armed position and a disarmed position. The armed position and the disarmed position of the triggering shaft 54 correspond to the armed mode and the disarmed mode of the mode selector 50, respectively. For example, in the armed mode of the mode selector 50, the triggering shaft 54 is in the armed position and, in the disarmed mode of the mode selector 50, the triggering shaft 54 is in the disarmed position. The triggering shaft 54 includes a shaft body 62, an interlock cam 64, and an auto-disarm cam 66.

The shaft body 62 extends along the rotational axis 60 between and to a first end 68 of the shaft body 62 and a second end 70 of the shaft body 62. The shaft body 62 is operably connected to the mode selector 50 at (e.g., on, adjacent, or proximate) the first end 68. The second end 70 is disposed at (e.g., on, adjacent, or proximate) the interlock first portion 56.

The interlock cam 64 is disposed at (e.g., on, adjacent, or proximate) the second end 70. The interlock cam 64 may be formed by a portion of the shaft body 62 or otherwise fixedly mounted to the shaft body 62 at (e.g., on, adjacent, or proximate) the second end 70. The interlock cam 64 extends radially outward from the shaft body 62 (e.g., relative to the rotational axis 60) to a distal end 72 of the interlock cam 64. The interlock cam 64 extends in a first radial direction R1 between and to the rotational axis 60 and the distal end 72. The interlock cam 64 may have a triangular or substantially triangular shape. For example, the interlock cam 64 may include a first side 74 and a second side 76 extending from the shaft body 62 toward the distal end 72. The first side 74 and the second side 76 may intersect at (e.g., on, adjacent, or proximate) the distal end 72. The present disclosure, however, is not limited to the foregoing exemplary configuration of the interlock cam 64. The interlock cam 64 is disposed at (e.g., on, adjacent, or proximate) the interlock first portion 56.

The auto-disarm cam 66 is disposed at (e.g., on, adjacent, or proximate) the interlock cam 64. For example, the auto-disarm cam 66 may be disposed axially adjacent the interlock cam 64 and axially between the interlock cam 64 and the first end 68. The auto-disarm cam 66 may be formed by a portion of the shaft body 62 or otherwise fixedly mounted to the shaft body 62. The auto-disarm cam 66 extends radially outward from the shaft body 62 (e.g., relative to the rotational axis 60) to a distal end 78 of the auto-disarm cam 66. The auto-disarm cam 66 extends in a second radial direction R2 between and to the rotational axis 60 and the distal end 78. The second radial direction R2 is different than the first radial direction R1. For example, the second radial direction R2 may be offset from the first radial direction R1 relative to the rotational axis 60 by an offset angle $\alpha$. The offset angle $\alpha$ may be greater than 90 degrees, for example, between 90 and 270 degrees or, more particularly, between 90 and 180 degrees. The present disclosure, however, is not limited to any particular value of the offset angle $\alpha$. The auto-disarm cam 66 of FIGS. 5 and 6A-D includes a first side 80 and a second side 82 extending from the shaft body 62 toward the distal end 72. The first side 80 and the second side 82 intersect at (e.g., on, adjacent, or proximate) the distal end 78. The first side 80 may have a concave shape as shown, for example, in FIGS. 6A-D. The present disclosure, however, is not limited to any particular shape of the first side 80.

The interlock first portion 56 is a portion of the interior door handle 34. The interlock first portion 56 may be disposed within the door 28 (see FIGS. 1-4). The interlock first portion 56 extends about (e.g., circumferentially, completely around) a rotational axis 84 of the interior door handle 34 and the exterior door handle 36, about which rotational axis 84 the interior door handle 34 is configured to rotate between the latched position and the unlatched position of the interior door handle 34. The rotational axis 84 may be normal (e.g., perpendicular) to the rotational axis 60 or otherwise angularly offset from the rotational axis 60. The interlock first portion 56 extends (e.g., axially extends relative to the rotational axis 84) between and to a proximate end 86 of the interlock first portion 56 and a distal end 88 of the interlock first portion 56. The distal end 88 is disposed at (e.g., on, adjacent, or proximate) the auto-disarm second portion 58. The distal end 88 may be a distal axial end of the interior door handle 34. Alternatively, a portion of the interior door handle 34 may axially extend into the exterior door handle 36 (e.g., the exterior door handle 36 may circumscribe a portion of the interior door handle 34). The interlock first portion 56 of FIG. 5 includes a cylindrical body 90 between (e.g., axially between) the proximate end 86 and the distal end 88. The cylindrical body 90 forms an outer surface 92 extending circumferentially about (e.g., completely around) the rotational axis 84. The outer surface 92 is disposed at (e.g., on, adjacent, or proximate) and facing the interlock cam 64.

The interlock first portion 56 further includes a locking sector 94 at (e.g., on, adjacent, or proximate) the proximate end 86. The locking sector 94 may be disposed at (e.g., on, adjacent, or proximate) an axial position of the distal end 72, relative to the rotational axis 84. The locking sector 94 may extend radially outward from the outer surface 92 relative to the rotational axis 84. The locking sector 94 is radially coincident with the interlock cam 64. The locking sector 94 extends circumferentially about a portion of the interlock first portion 56. For example, the locking sector 94 may extend circumferentially between and to a first circumferential end 96 of the locking sector 94 and a second circumferential end 98 of the locking sector 94. The locking sector 94 may circumferentially extend greater than 180 degrees about the rotational axis 84 between and to the first circumferential end 96 and the second circumferential end 98. The present disclosure, however, is not limited to any particular circumferential span of the locking sector 94 between the first circumferential end 96 and the second circumferential end 98. The locking sector 94 may form a circumferential gap 100 circumferentially between the first circumferential end 96 and the second circumferential end 98.

The auto-disarm second portion 58 is a portion of the exterior door handle 36. The auto-disarm second portion 58 may be disposed within the door 28 (see FIGS. 1-4). The auto-disarm second portion 58 extends about (e.g., circumferentially, completely around) the rotational axis 84, about which rotational axis 84 the exterior door handle 36 is configured to rotate, independent of the interior door handle 34, between the latched position and the unlatched position of the exterior door handle 36. The auto-disarm second portion 58 extends (e.g., axially extends relative to the rotational axis 84) between and to a proximate end 102 of the auto-disarm second portion 58 and a distal end 104 of the auto-disarm second portion 58. The distal end 104 is disposed at (e.g., on, adjacent, or proximate) the interlock first portion 56 (e.g., the distal end 88). The distal end 104 may be a distal axial end of the exterior door handle 36. The auto-disarm second portion 58 of FIG. 5 includes a cylindrical body 106 between (e.g., axially between) the proximate end 102 and the distal end 104. The cylindrical body 106 forms an outer surface 108 extending circumferentially about (e.g., completely around) the rotational axis 84. The outer surface 108 faces radially outward from the rotational axis 84. The outer surface 108 is disposed radially inward of the auto-disarm cam 66. The auto-disarm second portion 58 may additionally include a ring 110 disposed at (e.g., on, adjacent, or proximate) the proximate end 102. The ring 110 may extend circumferentially about (e.g., completely around) the rotational axis 84. The ring 110 may extend radially outward from the cylindrical body 106.

The auto-disarm second portion 58 further includes a disarming bumper 112. The disarming bumper 112 is disposed at (e.g., on, adjacent, or proximate) a circumferential position of the cylindrical body 106 and/or the ring 110. For example, the disarming bumper 112 may be formed by or otherwise mounted to the cylindrical body 106 and/or the ring 110. The disarming bumper 112 may extend axially, relative to the rotational axis 84, from the ring 110 to a distal end 114 of the disarming bumper 112. The disarming bumper 112 may extend axially from the ring 110 toward the interlock first portion 56. The distal end 114 may be disposed at (e.g., on, adjacent, or proximate) the distal end 104. The disarming bumper 112 is radially coincident with the auto-disarm cam 66.

Figure 6A:
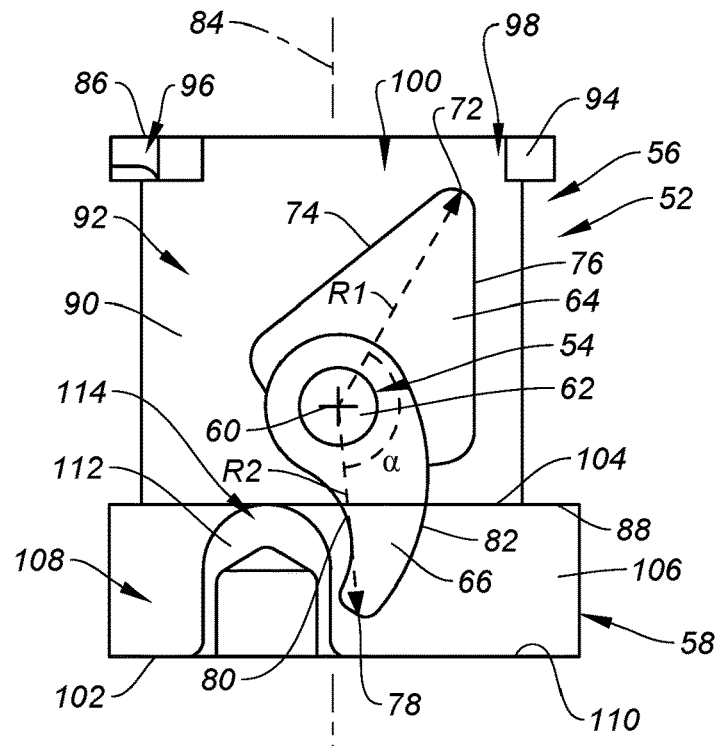
FIGS. 6A-D illustrate various conditions of an interlock assembly for the aircraft door assembly, in accordance with one or more embodiments of the present disclosure.
Figure 6B:
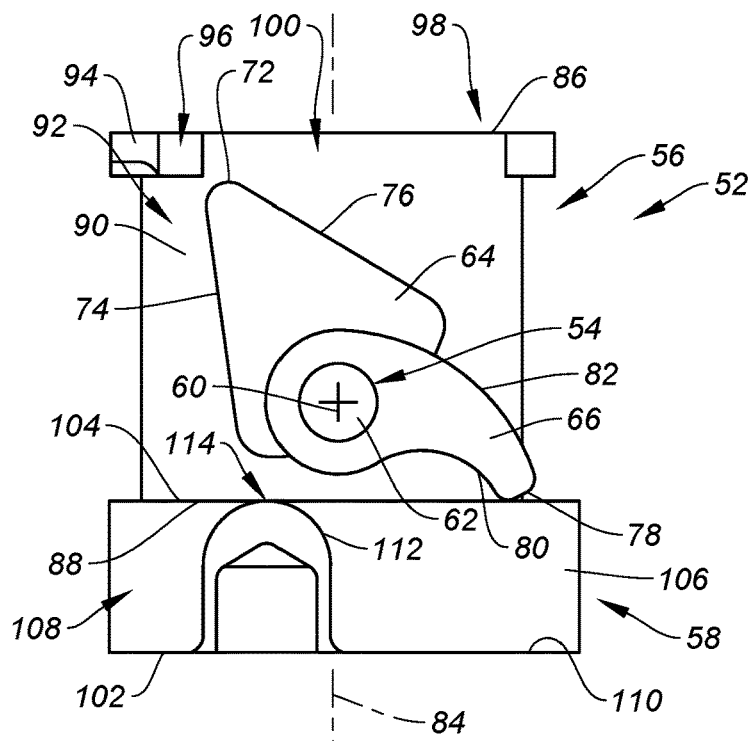
Figure 6C:
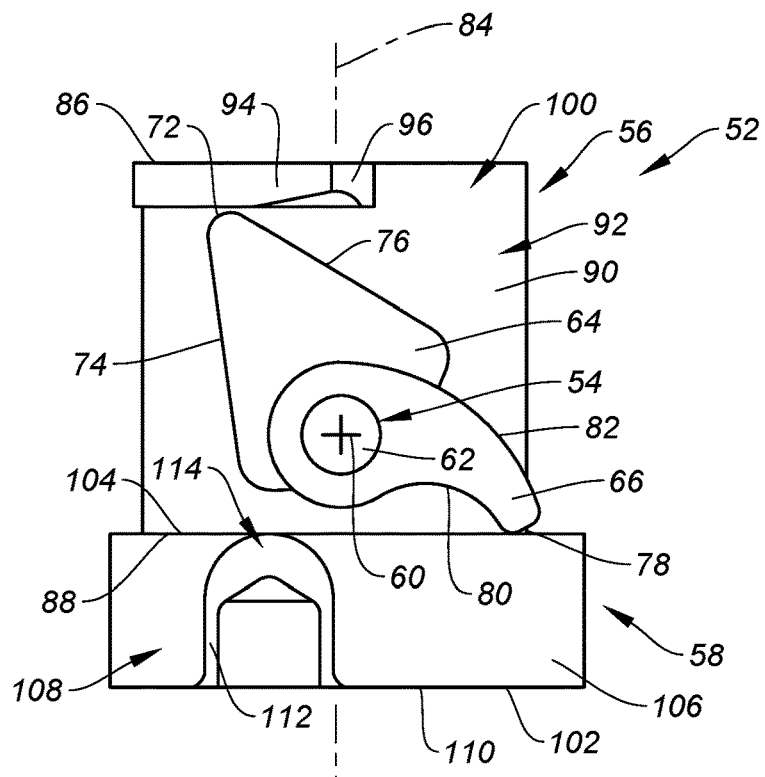
Figure 6D:
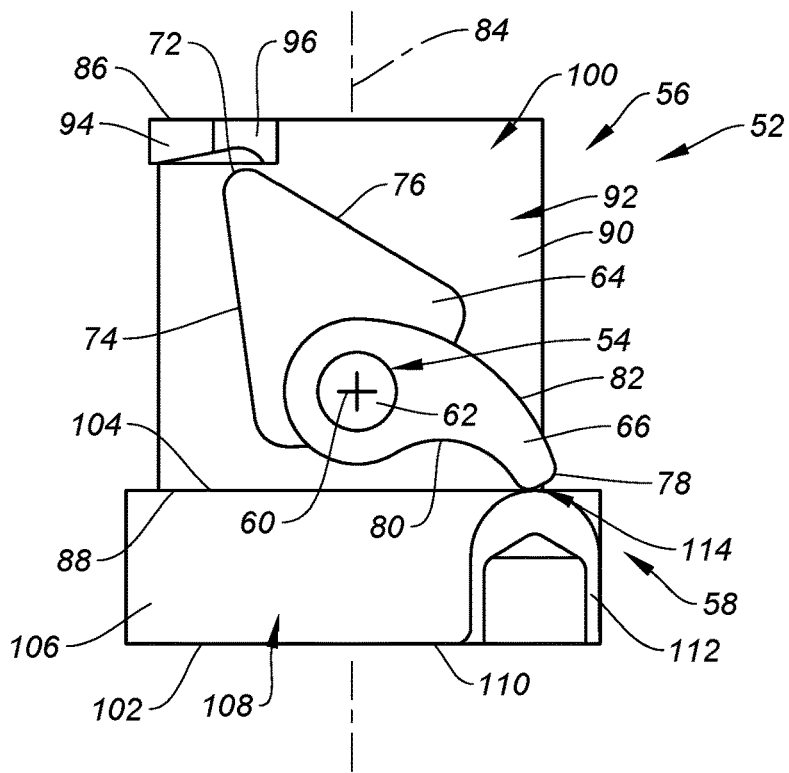

Referring to FIGS. 6A-D the interlock assembly 52 is illustrated for various positions of the triggering shaft 54 (e.g., the interlock cam 64 and the auto-disarm cam 66), the interlock first portion 56, and the auto-disarm second portion 58. As previously discussed, the triggering shaft 54 is rotatable about the rotational axis 60 between and to the armed position and the disarmed position. FIG. 6A illustrates the triggering shaft 54 in the armed position. FIGS. 6B-D illustrate the triggering shaft 54 in the disarmed position. In the armed position, the triggering shaft 54 is positioned with the interlock cam 64 axially separated from the locking sector 94 and with the auto-disarm cam 66 axially coincident with the auto-disarm second portion 58 and its disarming bumper 112, relative to the rotational axis 84. In the disarmed position, the triggering shaft 54 is positioned with the interlock cam 64 axially separated from the locking sector 94 and with the auto-disarm cam 66 axially separated from the disarming bumper 112, relative to the rotational axis 84. Rotation of the triggering shaft 54 (e.g., about the rotational axis 60), from the armed position to the disarmed position or from the disarmed position to the armed position, causes the distal end 72 to be axially coincident with the locking sector 94 for a portion of the rotation.

FIG. 6A illustrates the triggering shaft 54 in the armed position (e.g., the mode selector 50 in the armed mode), the interior door handle 34 (e.g., the interlock first portion 56) in the latched position, and the exterior door handle 36 (e.g., the auto-disarm second portion 58) in the latched position. In this condition, the interlock cam 64 (e.g., the distal end 72) is circumferentially coincident with the circumferential gap 100 formed by the locking sector 94 and the auto-disarm cam 66 is axially coincident with the disarming bumper 112. With the triggering shaft 54 in the armed position (e.g., as shown in FIG. 6A), opening the door 28 by rotating the exterior door handle 36 from the latched position to the unlatched position will operate the ESS 38 (e.g., the mode selector 50) to the disarmed mode. With the interior door handle 34 and the exterior door handle 36 in their respective latched positions, the triggering shaft 54 may be freely rotated between the armed position and the disarmed position (e.g., using the mode selector 50).

FIG. 6B illustrates the triggering shaft 54 in the disarmed position (e.g., the mode selector 50 in the disarmed mode), the interior door handle 34 (e.g., the interlock first portion 56) in the latched position, and the exterior door handle 36 (e.g., the auto-disarm second portion 58) in the latch position. In this condition, the interlock cam 64 (e.g., the distal end 72) is circumferentially coincident with the circumferential gap 100 formed by the locking sector 94 and the auto-disarm cam 66 is axially separated from the disarming bumper 112. With the triggering shaft 54 in the disarmed position (e.g., as shown in FIG. 6B), opening the door 28 by rotating the interior door handle 34 or the exterior door handle 36 from the latched position to the unlatched position, respectively, will not change the selected mode (e.g., the armed mode or the disarmed mode) of the ESS 38. With the interior door handle 34 and the exterior door handle 36 in their respective latched positions, the triggering shaft 54 may be freely rotated between the armed position and the disarmed position.

FIG. 6C illustrates the triggering shaft 54 in the disarmed position (e.g., the mode selector 50 in the disarmed mode), the interior door handle 34 (e.g., the interlock first portion 56) in the unlatched position or an intermediate position between the latched position and the unlatched position, and the exterior door handle 36 (e.g., the auto-disarm second portion 58) in the latch position. In this condition, the interlock cam 64 is circumferentially coincident with the locking sector 94 (e.g., the distal end 72 is disposed at the locking sector 94) and the auto-disarm cam 66 is axially separated from the disarming bumper 112. With the triggering shaft 54 in the disarmed position (e.g., as shown in FIG. 6C) and with the interlock cam 64 circumferentially coincident with the locking sector 94, the locking sector 94 prevents rotation of the triggering shaft 54 from the disarmed position to the armed position by blocking or otherwise obstructing rotation of the interlock cam 64 about the rotational axis 60, thereby preventing operation of the ESS 38 (e.g., the actuation system 42 and/or the inflatable slide 46) while the door 28 is in the open position or in the process of being opened. Preventing operation of the ESS 38 while the door 28 is in the open position or an intermediate position may additionally prevent or reduce the likelihood of a loss of or a jamming of the girt bar 48 (see FIG. 2).

FIG. 6D illustrates the triggering shaft 54 in the disarmed position (e.g., the mode selector 50 in the disarmed mode), the interior door handle 34 (e.g., the interlock first portion 56) in the latched position, and the exterior door handle 36 (e.g., the auto-disarm second portion 58) in the unlatched position or an intermediate position between the latched position and the unlatched position. In this condition, the interlock cam 64 (e.g., the distal end 72) is circumferentially coincident with the circumferential gap 100 formed by the locking sector 94 and the auto-disarm cam 66 (e.g., the distal end 78) is circumferentially coincident with the disarming bumper 112. With the triggering shaft 54 in the disarmed position (e.g., as shown in FIG. 6D) and with the auto-disarm cam 66 (e.g., the distal end 78) circumferentially coincident with the disarming bumper 112, the disarming bumper 112 prevents rotation of the triggering shaft 54 from the disarmed position to the armed position by blocking or otherwise obstructing rotation of the auto-disarm cam 66 about the rotational axis 60, thereby preventing actuation (e.g., inadvertent actuation) of the ESS 38 (e.g., the actuation system 42 and/or the inflatable slide 46) while the door 28 is in the open position or in the process of being opened. Moreover, rotation of the exterior door handle 36 (e.g., the auto-disarm second portion 58) from the latched position to or toward the unlatched position may effect rotation of the triggering shaft 54 from the armed position (see FIG. 6A) to the disarmed position by pushing against the auto-disarm cam 66 (e.g., the first side 80) as the exterior door handle 36 rotates. Accordingly, the interlock assembly 52 facilitates positioning of the triggering shaft 54 in the disarmed position when the door 28 is opened from the exterior of the aircraft (see FIG. 1) using the exterior door handle 36, thereby preventing actuation of the ESS 38 (e.g., the actuation system 42 and/or the inflatable slide 46).

The present disclosure interlock assembly 52 facilitates integration of multiple door assembly 26 interlock functions into a single component (e.g., the triggering shaft 54).

Accordingly, interlock and control functions of the door assembly 26 such as mode selection (e.g., armed or disarmed), interlock (e.g., preventing arming of the mode selector 50 with the door 28 open or opening), and auto-disarm (e.g., disarming the mode selector 50 when opening the door 28 from the aircraft 20 exterior) may be performed simply and precisely in comparison to at least some conventional aircraft door assemblies which may use three independent control mechanisms (e.g., each including multiple interfacing, movable components) for each function.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

What is claimed is:

1. A door assembly for an aircraft, the door assembly comprising:
    a door;
    an interior door handle and an exterior door handle, and the interior door handle and the exterior door handle are rotatable about a first rotational axis; and
    an emergency support system (ESS), the ESS includes a mode selector and an interlock assembly, the interlock assembly includes a shaft, a interlock first portion of the interior door handle, and a auto-disarm second portion of the exterior door handle,
        the mode selector has a selected mode, and the selected mode is one of an armed mode or a disarmed mode,
        the shaft extends along a second rotational axis between and to a first shaft end and a second shaft end, the first shaft end is operably connected to the mode selector, the shaft is rotatable about the second rotational axis between an armed position and a disarmed position, and the shaft includes an interlock cam and an auto-disarming cam at the second shaft end,
        the interlock first portion is rotatable about the first rotational axis between a first interlock position and a second interlock position, in the first interlock position, the interlock first portion permits rotation of the shaft between the armed position and the disarmed position and, in the second interlock position, the interlock first portion prevents rotation of the shaft from the disarmed position to the armed position, and
        the auto-disarm second portion is disposed at the interlock first portion on the first rotational axis, the auto-disarm second portion is rotatable about the first rotational axis between a first auto-disarm position and a second auto-disarm position, in the first auto-disarm position, the auto-disarm second portion permits rotation of the shaft between the armed position and the disarmed position and, in the second auto-disarm position, the auto-disarm second portion prevents rotation of the shaft from the disarmed position to the armed position.

2. The door assembly of claim 1, wherein the interlock cam extends in a first direction from the second rotational axis to a first distal end of the interlock cam, the auto-disarm cam extends in a second direction from the second rotational axis to a second distal end of the auto-disarm cam, the first direction is offset from the second direction by an offset angle relative to the second rotational axis, and the offset angle is greater than 90 degrees.

3. The door assembly of claim 1, wherein the locking cam is disposed at the interlock first portion.

4. The door assembly of claim 3, wherein the auto-disarm cam is disposed radially between the locking cam and the first shaft end relative to the second rotational axis.

5. The door assembly of claim 1, wherein:
the interlock first portion forms a locking sector extending circumferentially about the first rotational axis between and to a first circumferential end and a second circumferential end, and the locking sector forms a circumferential gap between the first circumferential end and the second circumferential end;
in the first interlock position, the interlock cam is disposed circumferentially coincident with the circumferential gap; and
in the second interlock position, the interlock cam is disposed circumferentially coincident with the locking sector.

6. The door assembly of claim 5, wherein, in the second interlock position, the locking sector is configured to prevent rotation of the shaft from the disarmed position to the armed position by blocking rotation of the interlock cam about the second rotational axis.

7. The door assembly of claim 1, wherein the auto-disarm second portion includes a disarming bumper, and the disarming bumper is radially coincident with the auto-disarm cam.

8. The door assembly of claim 7, wherein the disarming bumper is configured to contact the auto-disarm cam to effect rotation of the shaft from the armed position to the disarmed position as the auto-disarm second portion rotates from the first auto-disarm position to the second auto-disarm position.

9. The door assembly of claim 7, wherein the auto-disarm second portion includes a cylindrical body extending circumferentially about the first rotational axis, the disarming bumper is disposed at a circumferential position of the cylindrical body relative to the first rotational axis, and the disarming bumper extends radially outward from the cylindrical body relative to the first rotational axis.

10. The door assembly of claim 7, wherein:
in the armed position of the shaft, the auto-disarm cam is disposed axially coincident with the disarming bumper, relative to the first rotational axis; and
in the disarmed position of the shaft, the auto-disarm cam is axially separated from the disarming bumper, relative to the first rotational axis.

11. The door assembly of claim 1, wherein each of the interior door handle and the exterior door handle are independently rotatable about the first rotational axis relative to an other of the interior door handle and the exterior door handle.

12. A door assembly for an aircraft, the door assembly comprising:
a door;
an interior door handle and an exterior door handle, and the interior door handle and the exterior door handle are rotatable about a first rotational axis;
a mode selector having a selected mode, and the selected mode is one of an armed mode or a disarmed mode; and
an interlock assembly for the mode selector, the interlock assembly includes a shaft, a interlock first portion of the interior door handle, and a auto-disarm second portion of the exterior door handle,
the shaft extends along a second rotational axis between and to a first shaft end and a second shaft end, the first shaft end is operably connected to the mode selector, the shaft is rotatable about the second rotational axis between an armed position and a disarmed position corresponding to the armed mode and the disarmed mode, respectively, and the shaft includes an interlock cam and an auto-disarming cam,
the interlock first portion is rotatable with the interior door handle about the first rotational axis between a first interlock position and a second interlock position, in the first interlock position, the interlock first portion permits rotation of the shaft between the armed position and the disarmed position and, in the second interlock position, the interlock first portion obstructs rotation of the shaft from the disarmed position to the armed position, and
the auto-disarm second portion is rotatable with the exterior door handle about the first rotational axis between a first auto-disarm position and a second auto-disarm position, in the first auto-disarm position, the auto-disarm second portion permits rotation of the shaft between the armed position and the disarmed position and, in the second auto-disarm position, the auto-disarm second portion obstructs rotation of the shaft from the disarmed position to the armed position.

13. The door assembly of claim 12, wherein the second rotational axis is perpendicular to the first rotational axis.

14. The door assembly of claim 12, further comprising an emergency support system (ESS), the ESS includes the mode selector, the interlock assembly, and an actuation system operably connected to the door, wherein the mode selector is selectively configurable in the armed mode or the disarmed mode to control actuation of the actuation system.

15. The door assembly of claim 12, further comprising an emergency support system (ESS), the ESS includes an inflatable slide operably connected to the door, wherein the mode selector is selectively configurable in the armed mode or the disarmed mode to control actuation of the inflatable slide.

16. The door assembly of claim 12, wherein the auto-disarm second portion includes a disarming bumper, and the disarming bumper is radially coincident with the auto-disarm cam.

17. The door assembly of claim 16, wherein the auto-disarm cam includes a concave side configured to face the disarming bumper with the shaft in the armed position.

18. An interlock assembly for an aircraft door, the interlock assembly comprising:
a shaft extending along a second rotational axis between and to a first shaft end and a second shaft end, the shaft is rotatable about the second rotational axis between an armed position and a disarmed position, and the shaft includes an interlock cam and an auto-disarming cam at the second shaft end;
a interlock first portion, the interlock first portion is rotatable about a first rotational axis between a first interlock position and a second interlock position, the interlock first portion includes a first cylindrical body and a locking sector, the first cylindrical body extends circumferentially about the first rotational axis, the locking sector extends circumferentially about the first rotational axis between and to a first circumferential end and a second circumferential end, the locking sector extends radially outward from the first cylindrical body relative to the first rotational axis, the locking sector forms a circumferential gap between the first circumferential end and the second circumferential end, in the first interlock position, the locking sector is positioned to permit rotation of the shaft between the armed position and the disarmed position and, in the second interlock position, the locking sector is positioned to obstruct the interlock cam to prevent rotation of the shaft from the disarmed position to the armed position; and a auto-disarm second portion is disposed axially adjacent the interlock first portion relative to the first rotational axis, the auto-disarm second portion is rotatable about the first rotational axis between a first auto-disarm position and a second auto-disarm position, the auto-disarm second portion includes a second cylindrical body and a disarming bumper, the second cylindrical body extends circumferentially about the first rotational axis, the disarming bumper extends radially outward from the second cylindrical body relative to the first rotational axis, the disarming bumper is radially coincident with the auto-disarm cam relative to the first rotational axis, in the first auto-disarm position, the disarming bumper is positioned to permit rotation of the shaft between the armed position and the disarmed position and, in the second auto-disarm position, the disarming bumper is positioned to obstruct the auto-disarm cam to prevent rotation of the shaft from the disarmed position to the armed position.

19. The interlock assembly of claim 18, wherein the second rotational axis is perpendicular to the first rotational axis.

20. The interlock assembly of claim 18, wherein the disarming bumper is configured to contact the auto-disarm cam to effect rotation of the shaft from the armed position to the disarmed position as the auto-disarm second portion rotates from the first auto-disarm position to the second auto-disarm position.

\* \* \* \* \*